United States Patent
Hill et al.

(10) Patent No.: US 6,407,896 B1
(45) Date of Patent: Jun. 18, 2002

(54) POWER SYSTEM AND METHOD OF OPERATION

(75) Inventors: Charles C. Hill, Gilbert; John H. Kelly; Kevin Loutfy, both of Phoenix; Naufel Chafic Naufel, Tempe, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/540,019

(22) Filed: Mar. 31, 2000

(51) Int. Cl.[7] ................................................ H02H 3/00
(52) U.S. Cl. ........................................................ 361/62
(58) Field of Search .............................. 361/62, 64, 66, 361/93, 119, 68, 69

(56) References Cited

U.S. PATENT DOCUMENTS 4,983,955 A * 1/1991 Ham et al. .................. 340/664
6,195,243 B1 * 2/2001 Spencer et al. ............... 361/64

* cited by examiner

*Primary Examiner*—Edward H. Tso
*Assistant Examiner*—Pia Tibbits
(74) *Attorney, Agent, or Firm*—Scott Kevin Pickens; Kevin D. Wills

(57) ABSTRACT

A power system includes a cable connector (120), a cable (110) comprised of a plurality of wires (211, 212, and 213), and a circuit (230, 421, 422, or 500) for sensing a connection for the cable connector. The circuit is located adjacent to the cable connector and is capable of sensing a predetermined connection condition of the connection of the cable connector. Each wire has an end located within the cable connector.

13 Claims, 2 Drawing Sheets

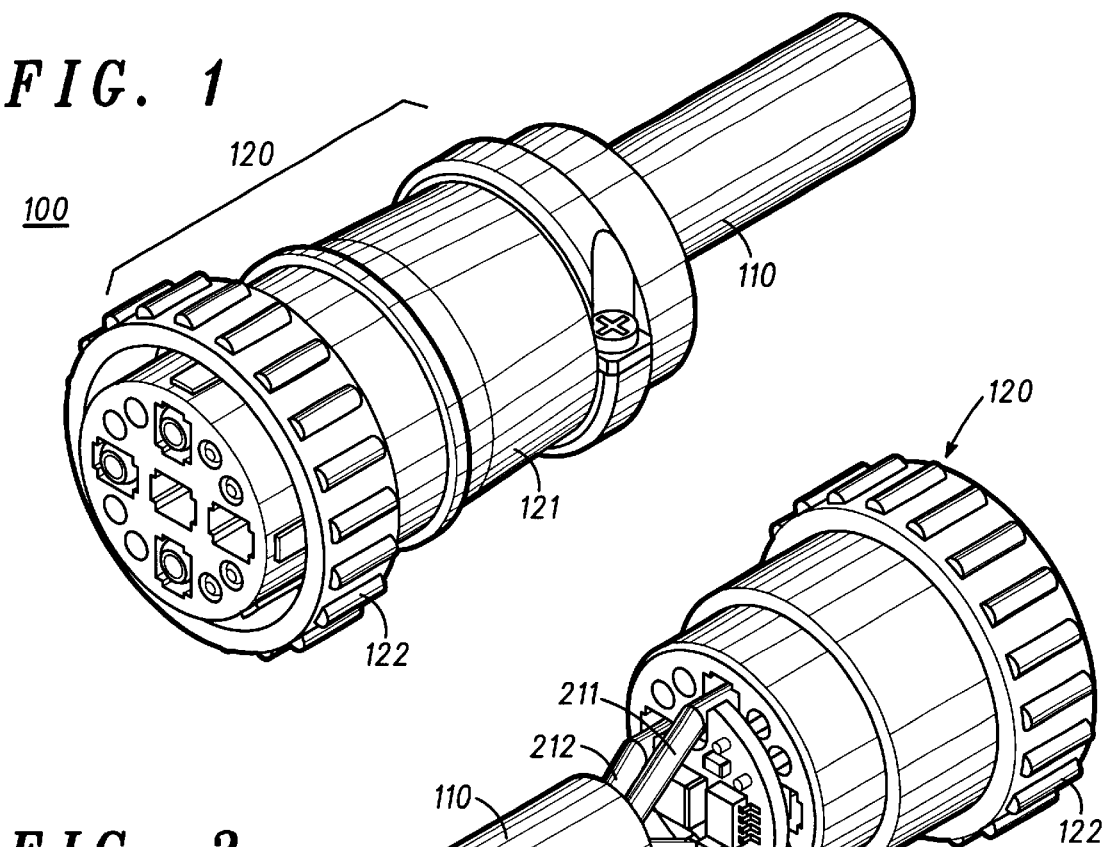
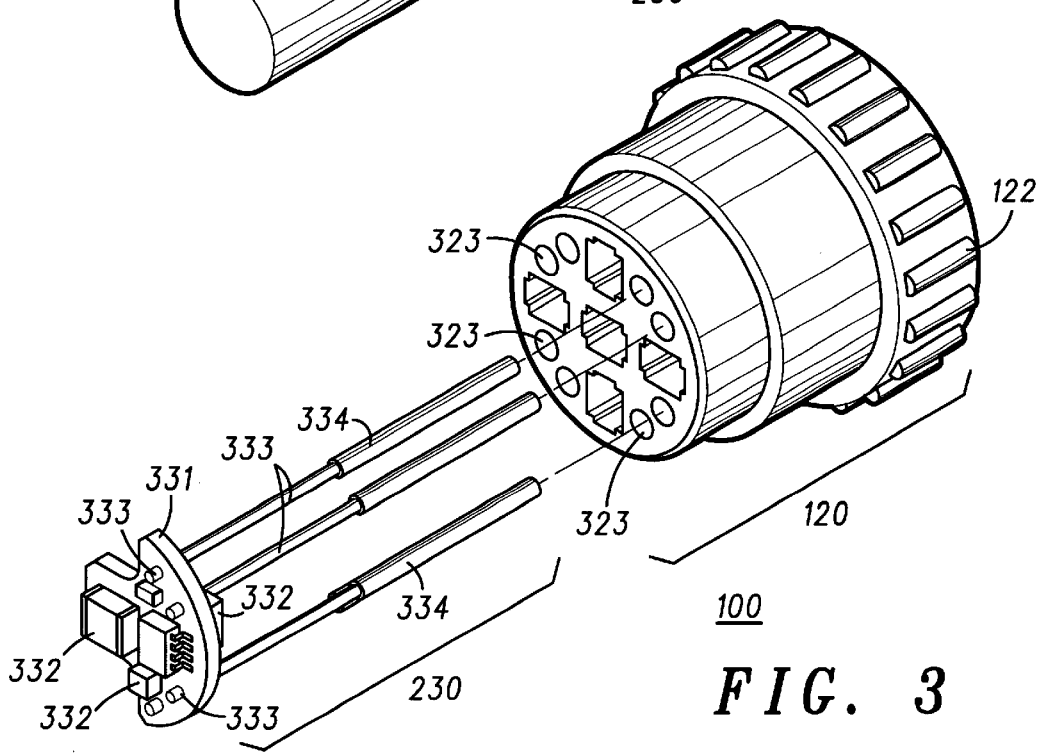

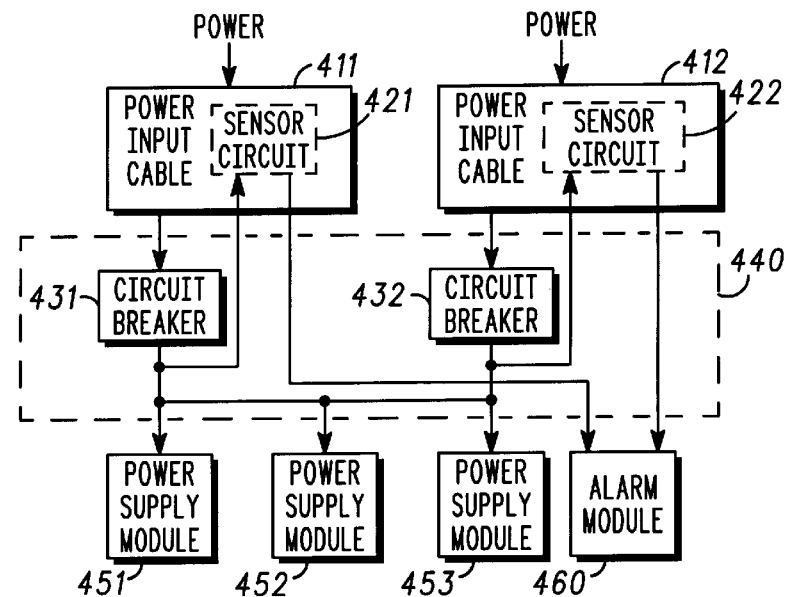
FIG. 4
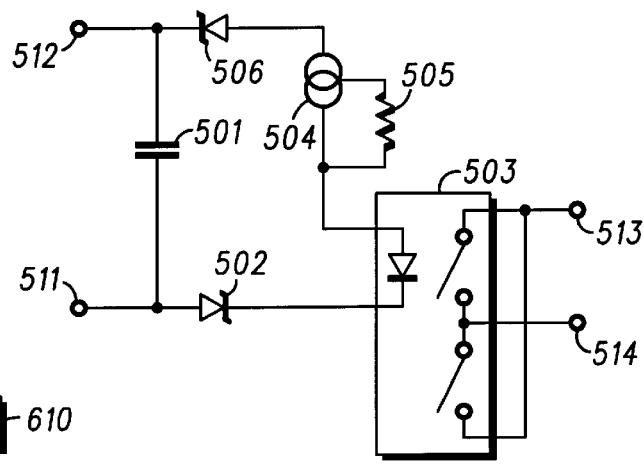
FIG. 5
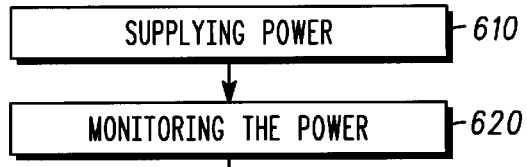
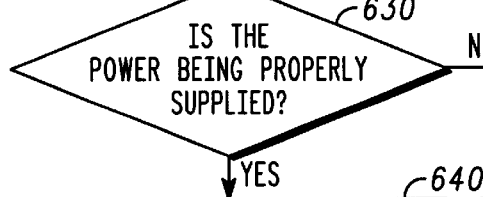
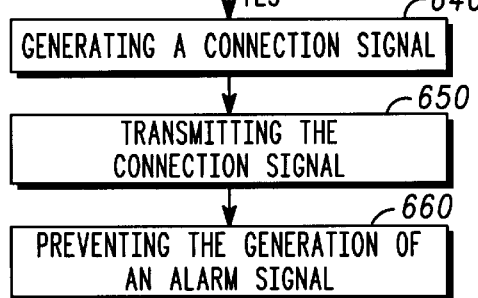
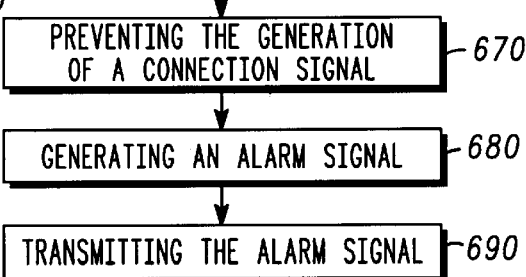
FIG. 6

POWER SYSTEM AND METHOD OF OPERATION

RELATED APPLICATION

Related subject matter is disclosed in United States patent application number 9/541,384 filed on Mar. 31, 2000 and assigned to the same assignee.

FIELD OF THE INVENTION

This invention relates in general, to electronics, and more particularly, to power systems and their methods of operation.

BACKGROUND OF THE INVENTION

Highly reliable power systems have a redundant power input cable and a redundant power supply. These power systems may monitor the power supplies to determine when the redundant power supply is needed to keep the power system operational. However, these highly reliable power systems do not determine or monitor whether or when the redundant power input cable is needed to keep the power system operational. Accordingly, a need exists for a power system and method of operation having the capability to monitor incoming power and to indicate when the redundant power input cable is in use.

BRIEF DESCRIPTION OF THE DRAWINGS

The invention will be better understood from a reading of the following detailed description, taken in conjunction with the accompanying drawing figures in which:

FIG. 1 illustrates an isometric view of an electrical cable or power input cable in accordance with an embodiment of the invention;

FIG. 2 illustrates a rotated isometric view of a portion of the power input cable of FIG. 1 in accordance with an embodiment of the invention;

FIG. 3 illustrates a rotated, exploded isometric view of a portion of the power input cable of FIG. 1 in accordance with an embodiment of the invention;

FIG. 4 illustrates a block diagram of a power system in accordance with an embodiment of the invention;

FIG. 5 illustrates a circuit diagram of a circuit in the power input cable and in the power system with an embodiment of the invention; and FIG. 6 illustrates a flow chart of a method of operating a power system in accordance with an embodiment of the invention.

For simplicity and clarity of illustration, the drawing figures illustrate the general manner of construction, and elements in the drawing figures are not necessarily drawn to scale. Additionally, the same reference numerals in different figures denote the same elements, and descriptions and details of well-known features and techniques are omitted to avoid unnecessarily obscuring the invention.

DETAILED DESCRIPTION OF THE DRAWINGS

FIG. 1 illustrates an isometric view of an electrical cable or power input cable 100. Power input cable 100 is comprised of a cable 110 and a cable connector 120. Cable connector 120 is comprised of a casing or shell 121 and a base 122. Shell 121 is removably coupled to base 122 and mechanically secures cable 110 to base 122. Shell 121 also protects the components of power input cable 100 that are located within shell 121. Power input cable 100 is a field-replaceable unit, as explained in more detail hereinafter. In the preferred embodiment, power input cable 100 is for providing Direct Current (DC) power.

FIG. 2 illustrates a rotated isometric view of power input cable 100 without shell 121 (FIG. 1). In FIG. 2, cable 110 is illustrated to include a plurality of wires 211, 212, and 213. Each of wires 211, 212, and 213 have an end located within a different hole in base 122 of cable connector 120. During use, wire 211 preferably carries a DC voltage of approximately negative forty-eight volts while wire 213 preferably carries a DC return voltage of approximately negative forty-eight volts and while wire 212 preferably carries a DC ground voltage of zero volts.

Power input cable 100 also includes a circuit 230 for sensing a predetermined connection condition of a connection for power input cable 100 and, more particularly, for base 122 of cable connector 120. The predetermined connection condition or conditions can include, for example, a circuit breaker conducting electricity to circuit 230 and/or cable connector 120 and wires 211, 212, and 213 properly coupled to a power distribution module. The predetermined connection condition or conditions are explained in more detail hereinafter.

Circuit 230 is located adjacent to base 122 of cable connector 120 and is preferably encased by shell 121 (FIG. 1) such that circuit 230 is located within cable connector 120. This preferred configuration of circuit 230 protects circuit 230 from contamination and mechanical damage. Circuit 230 is electrically coupled to wires 211, 212, and 213 of cable 110. However, the electrical connection between circuit 230 and wires 211, 212, and 213 is preferably located external to cable connector 120, as explained in more detail hereinafter.

FIG. 3 illustrates a rotated, exploded isometric view of a portion of power input cable 100. Circuit 230 includes a circuit board 331 and a plurality of circuit components 332 mounted onto both sides of circuit board 331. Viewing FIGS. 1, 2, and 3 in combination, one skilled in the art will understand that the shape or configuration of circuit board 331 and the position of components 332 permit shell 121 (FIG. 1) to protect circuit 230 from contamination and mechanical damage.

Circuit 230 also includes a plurality of posts or pins 333 extending through circuit board 331 and protruding from opposite sides of circuit board 331. Circuit 230 also includes a plurality of posts or sleeves 334. Ends of pins 333 are inserted into sleeves 334 and are secured within sleeves 334 by, for example, crimping sleeves 334. Sleeves 334 and pins 333 are inserted into holes 323 of base 122 where holes 323 are located in a planar surface of base 122. This embodiment of circuit 230 can provide stability for circuit board 331. For example, if the lengths of sleeves 334 and the lengths of the portions of pins 333 located beneath circuit board 331 are shorter than or approximately equal to the depths of holes 323, then circuit 230 can be coupled to base 122 such that the planar surface of base 122 supports circuit board 331.

The use of pins 333 and sleeves 334 also permit circuit 230 to be keyed into holes 323 in a single predetermined orientation. This embodiment of circuit 230 facilitates the assembly of power input cable 100 by using a single step to self-align and simultaneously mechanically and electrically couple circuit 230 to base 122. Therefore, pins 333, and optionally sleeves 334, serve as mechanical and electrical connectors. After circuit 230 is coupled to base 122, wires 211, 212, and 213 of cable 110 are inserted into other holes in the planar surface of base 122, and then shell 121 is coupled to base 122 to mechanically secure cable 110 to base 122.

FIG. 4 illustrates a block diagram of a power system 400. In the preferred embodiment, power system 400 is for providing DC power. System 400 includes a plurality of redundant power input cables 411 and 412. Cables 411 and 412 include sensor circuits 421 and 422, respectively. Power input cables 411 and 412 are electrically coupled to circuit breakers 431 and 432, respectively. Circuit breakers 431 and 432 are also electrically coupled to sensor circuits 421 and 422, respectively. Circuit breakers 431 and 432 can be part of a power distribution module 440, or circuit breakers 431 and 432 can be separate components from power distribution module 440. Power distribution module 440 is electrically coupled to each of redundant power supply modules 451, 452, and 453. Sensor circuits 421 and 422 are also electrically coupled to an alarm module 460.

In the preferred embodiment, power distribution module 440 is located adjacent to and is electrically coupled to the plurality of power supply modules 451, 452, and 453. Power distribution module 440 is also preferably located adjacent to and mechanically coupled to power input cables 411 and 412.

Power input cables 411 and 412 supply power to power distribution module 440. In the preferred embodiment, power input cables 411 and 412 are each preferably similar to power input cable 100 of FIGS. 1, 2, and 3. Accordingly, sensor circuits 421 and 422 of FIG. 4 are each preferably similar to circuit 230 of power input cable 100 in FIGS. 2 and 3.

Furthermore, power input cables 411 and 412 of FIG. 4 each preferably have a cable connector similar to cable connector 120 of power input cable 100 in FIGS. 1, 2, and 3. The cable connectors of each of power input cables 411 and 412 of FIG. 4 are each mechanically coupled to power distribution module 440. The cable connectors of each of power input cables 411 and 412 are also removably coupled to power distribution module 440 to facilitate the maintenance of power system 400.

Power input cables 411 and 412 also include a plurality of electrically conductive wires similar to wires 211, 212, and 213 of power input cable 100 in FIG. 2. The electrically conductive wires in power input cables 411 and 412 can be electrically coupled to power distribution module 440 via circuit breakers 431 or 432, or each of the electrically conductive wires in power input cables 411 and 412 can be electrically coupled to circuit breakers 431 or 432 via power distribution module 440. At least one of the plurality of electrically connective wires in power input cable 411 is electrically coupled to circuit breaker 431, and at least one of the plurality of electrically connective wires in power input cable 412 is electrically coupled to circuit breaker 432. Alternatively, each of the wires within cables 411 and 412 can be electrically coupled to a separate circuit breaker.

In the preferred embodiment, circuit breakers 431 and 432 are located external to the cable connectors of power input cables 411 and 412. Circuit breakers 431 and 432 are located adjacent to power distribution module 440 and are can be located within power distribution module 440. Circuit breakers 431 and 432 electrically couple the plurality of electrically conductive wires in power input cables 411 and 412 to each of the plurality of power supply modules 451, 452, and 453. Circuit breakers 431 and 432 also electrically couple the pluralities of electrically conductive wires in power input cables 411 and 412 to one of sensor circuits 421 or 422.

Circuits 421 and 422 sense or detect if power is supplied from power input cables 411 and 412 to power distribution module 440. Sensor circuit 421 is electrically coupled to the plurality of electrically conductive wires in power input cable 411 via circuit breaker 431, and sensor circuit 421 senses a connection between power input cable 411 and power distribution module 440, and more particularly, between the cable connector of power input cable 411 and power distribution module 440. Sensor circuit 422 is electrically coupled to the plurality of electrically conductive wires in power input cable 412 via circuit breaker 432, and sensor circuit 422 senses a connection between power input cable 412 and power distribution module 440, and more particularly, senses a connection between the cable connector of power input cable 412 and power distribution module 440.

Alarm module 460 is preferably located adjacent to power distribution module 440 and is electrically coupled to circuits 421 and 422 to provide an alarm when circuit 421 or 422 detect a predetermined alarm condition of the connection between the cable connectors of power input cables 411 and 412 and power distribution module 440. Examples of a predetermined alarm condition include, for example, when one of circuit breakers 431 or 432 is tripped and/or when one of power input cables 411 or 412 is uncoupled from power distribution module 440.

When circuit 421 senses a proper connection between power input cable 411 and power distribution module 440, circuit 421 generates a connection signal and transmits the connection signal to alarm module 460. If circuit 421 fails to detect a proper connection between power input cable 411 and power distribution module 440, then sensor circuit 421 does not generate the connection signal and, therefore, cannot or fails to transmit the connection signal. Alarm module 460 does not receive the connection signal from sensor circuit 421 because circuit 421 did not transmit the connection signal. Accordingly, alarm module 460 transmits an alarm signal in response to not receiving the connection signal.

Circuit 422 operates in a similar manner to circuit 421. For example, when circuit 422 senses a proper connection between power input cable 412 and power distribution module 440, circuit 422 generates a connection signal and transmits the connection signal to alarm module 460. If circuit 422 fails to detect a proper connection between power input able 412 and power distribution module 440, then sensor circuit 422 does not generate the connection signal and, therefore, cannot or fails to transmit the connection signal. Alarm module 460 does not receive the connection signal from sensor circuit 422 because circuit 422 did not transmit the connection signal. Accordingly, alarm module 460 transmits an alarm signal in response to not receiving the connection signal.

Power system 400 includes redundant power input cables so that power system 400 remains in operation even if one of power input cables 411 or 412 becomes uncoupled or disconnected from power distribution module 440, if one of power input cables 411 or 412 becomes non-functional, or if one of circuit breakers 431 or 432 is tripped. In the event that one of power input cables 411 and 412 need to be replaced, power system 400 can remain in operation before such replacement occurs and also during such replacement. Accordingly, power input cables 411 and 412 are field-replaceable units.

FIG. 5 illustrates a diagram of a circuit 500. As an example, circuit 500 can be the same as circuit 230 in power input cable 100 of FIGS. 2 and 3, and can also be the same as circuits 421 and 422 of power system 400 in FIG. 4. Circuit 500 includes a capacitor 501 electrically coupled to nodes 511 and 512. As an example, node 511 can be coupled to wire 211 of cable 110 in FIG. 2, and node 512 can be coupled to wire 213 of cable 110 in FIG. 2. In the preferred embodiment, these connections or couplings are made outside of cable connector 120 (FIGS. 1, 2, and 3), as illustrated in FIG. 4.

Circuit 500 I FIG. 5 also includes a Zener diode 502 coupled to node 511 and capacitor 501. Circuit 500 further includes an optical isolator 503 electrically coupled to Zener diode 502. Optical isolator 503 is electrically coupled to nodes 513 and 514, which are electrically coupled to an alarm module such as, for example, alarm module 460 in FIG. 4.

Circuit 500 in FIG. 5 additionally includes a current source 504 electrically coupled to optical isolator 503, and circuit 500 still further includes a resistor 505 electrically coupled to optical isolator 503 and current source 504. Moreover, circuit 500 includes a Zener diode 506 electrically coupled to current source 504, capacitor 501, and node 512.

In the preferred embodiment illustrated in FIG. 5, Zener diode 502, optical isolator 503, current source 504, and Zener diode 506 are in parallel with capacitor 501. Also in the preferred embodiment, Zener diode 502, optical isolator 503, current source 504, and Zener diode 506 are in series with each other. Furthermore, current source 504 is preferably a voltage-regulated current source. The simple circuitry of circuit 500 improves the reliability of circuit 500.

If the voltage potential between nodes 511 and 512 is too low, then Zener diodes 502 and 506 will turn off, and current source 504 will not generate any current. When current source 504 does not generate any current, then optical isolator 503 will not generate or transmit the connection signal. Under these conditions, the gates within optical isolator 503 remain open.

However, if the voltage potential between nodes 511 and 512 is not too low, then Zener diodes 502 and 506 will turn on, and current source 504 will generate a current. When current source 504 generates the current, then the gates within optical isolator 503 are closed, and optical isolator 503 generates and transmits the connection signal to an alarm module.

FIG. 6 illustrates a flow chart of a method 600 of operating a power system. As an example, method 600 can be used to operate power system 400 of FIG. 4. At a step 610 of method 600 in FIG. 6, power is supplied. As an example, the power can be supplied by or from a power input cable to a power distribution module. In the preferred embodiment, the power input cable is similar to cable 100 of FIGS. 1, 2, and 3 and cables 411 or 412 of FIG. 4, and the power distribution module is similar to power distribution module 440 of FIG. 4.

At a step 620 of method 600 in FIG. 6, the power is monitored. As an example, the power can be monitored by a power sensing circuit. In the preferred embodiment, the power sensing circuit is similar to circuit 230 of power input cable 100 in FIGS. 2 and 3, circuits 421 and 422 of power input cables 411 and 412, respectively, in FIG. 4, and circuit 500 in FIG. 5.

At a step 630 of method 600 in FIG. 6, a determination is made as to whether the power is actually being properly supplied. As an example, the power sensing circuit of step 620 can also be used to determine whether the power is being properly supplied from the power input cable to the power distribution module.

If the power is detected to be properly supplied at step 630, then at a step 640, a connection signal is generated. As an example, the power sensing circuit of steps 620 and 630 can also be used to generate the connection signal. Next, at a step 650, the connection signal is transmitted. As an example, the power sensing circuit of steps 620, 630, and 640 can further be used to transmit the connection signal. Then, at a step 660, an alarm signal is prevented from being generated. As an example, the connection signal can be transmitted to an alarm module such as module 460 of FIG. 4. In response to receiving the connection signal, the alarm module is prevented from generating an alarm signal.

However, if the power is not detected to be properly supplied at step 630, then at a step 670, the connection signal is prevented from being generated. As an example, the power sensing circuit can prevented from generating the connection signal due to conditions such as a circuit breaker, such as circuit breaker 431 or 432 in FIG. 4, being tripped. Additionally, the power sensing circuit can be prevented from generating the connection signal due to an improper connection between, a disconnection of, or an uncoupling of the power input cable from the power distribution module. Next, at a step 680, an alarm signal is generated. As an example, an alarm module such as alarm module 460 in FIG. 4 can generate the alarm signal in response to not receiving the connection signal from the power sensing circuit that failed to generate the connection signal. Then, at a step 690, the alarm signal is transmitted. As an example, the alarm module can audibly and/or visually transmit the alarm signal. The transmission of the alarm signal in a power system such as system 400 in FIG. 4 indicates that the redundant power input cable is in use and that either the primary power cable needs to be replaced or a circuit breaker needs to be reset or replaced. This indication of the need for system maintenance improves the reliability of the power system.

Therefore, an improved power system and method of operation is provided to overcome the disadvantages of the prior art. The power system and its method of operation have the capability to monitor in-coming power and to indicate when the redundant power input cable is in use and when the system requires maintenance.

Although the invention has been described with reference to specific embodiments, it will be understood by those skilled in the art that various changes may be made without departing from the spirit or scope of the invention. For instance, the numerous details set forth herein such as, for example, the specific number of power input cables and power supply modules in power system 400 of FIG. 4 are provided to facilitate the understanding of the invention and are not provided to limit the scope of the invention. Furthermore, each of sensor circuits 421 and 422 in FIG. 4 can be coupled to a separate alarm module. Additionally, an alarm module can be contained within cable connector 120 in FIGS. 1, 2, and 3. Moreover, circuit 230 in FIGS. 2 and 3 can be located external to cable connector 120. Moreover, the keying concept for circuit 230 in FIG. 3 can be applied to other electrical cables besides DC power input cables. Accordingly, the disclosure of embodiments of the invention is intended to be illustrative of the scope of the invention and is not intended to be limiting. It is intended that the scope of the invention shall be limited only to the extent required by the appended claims.

What is claimed is:

1. A redundant power system comprising:
   a plurality of power supply modules;
   a power distribution module electrically coupled to the plurality of power supply modules;
   a first connector removably coupled to the power distribution module;
   a first power cable comprised of a first plurality of electrically conductive wires for supplying power to the power distribution module, wherein each of the first plurality of electrically conductive wires has a first end located within the first connector;

a second connector removably coupled to the power distribution module;

a second power cable comprised of a second plurality of electrically conductive wires for supplying power to the power distribution module, wherein each of the second plurality of electrically conductive wires has a second end located within the second connector, and wherein the first power cable and the second power cable redundantly supply power to the power distribution module;

a plurality of circuits for sensing if power is supplied from the first and second pluralities of electrically conductive wires to the power distribution module, wherein a first one of the plurality of circuits is electrically coupled to the first plurality of electrically conductive wires and located within the first connector, wherein the first one of the plurality of circuits senses a connection between the first plurality of electrically conductive wires and the power distribution module, wherein a second one of the plurality of circuits is electrically coupled to the second plurality of electrically conductive wires and located within the second connector, and wherein the second one of the plurality of circuits senses a connection between the second plurality of electrically conductive wires and the power distribution module; and an alarm module electrically coupled to the first one and the second one of the plurality of circuits, wherein the alarm module provides an alarm when the first one of the plurality of circuits detects a first predetermined alarm condition of the connection between the first plurality of electrically conductive wires and the power distribution module, and wherein the alarm module provides the alarm when the second one of the plurality of circuits detects a second predetermined alarm condition of the connection between the second plurality of electrically conductive wires and the power distribution module.

2. The redundant power system of claim 1, further comprising:

a first circuit breaker located external to the first connector, wherein the first circuit breaker electrically couples the first one of the plurality of circuits to the first plurality of electrically conductive wires; and a second circuit breaker located external to the second connector, wherein the second circuit breaker electrically couples the second one of the plurality of circuits to the second plurality of electrically conductive wires.

3. The redundant power system of claim 2, wherein the first predetermined alarm condition occurs when the first circuit breaker is tripped, and wherein the second predetermined alarm conditions occurs when the second circuit breaker is tripped.

4. The redundant power system of claim 1, wherein the first one of the plurality of circuits transmits a first connection signal to the alarm module when the first one of the plurality of circuits senses a first predetermined connection condition of the connection of the first plurality of electrically conductive wires to the power distribution module, and wherein the alarm module transmits the alarm when the first one of the plurality of circuits fails to send the first connection signal.

5. The redundant power system of claim 1, wherein the second one of the plurality of circuits transmits a second connection signal to the alarm module when the second one of the plurality of circuits senses a second predetermined connection condition of the connection of the second plurality of electrically conductive wires to the power distribution module, and wherein the alarm module transmits the alarm when the second one of the plurality of circuits fails to send the second connection signal.

6. The redundant power system of claim 1 wherein:

the first predetermined alarm condition occurs when the first connector is uncoupled from the power distribution module, and wherein the second predetermined alarm condition occurs when the second connector is uncoupled from the power distribution module.

7. The redundant power system of claim 1 wherein the first one of the plurality of circuits comprises:

a first capacitor coupled to a first and second ones of the first plurality of electrically conductive wires;

a first Zener diode coupled to the first one of the first plurality of electrically conductive wires and the first capacitor;

a first optical isolator coupled to the first Zener-diode and the alarm module;

a first voltage-regulated current source coupled to the first optical isolator;

a first resistor coupled to the first optical isolator and the first voltage-regulated current source; and a second Zener diode coupled to the first voltage-regulated current source, the first capacitor, and the second one of the first plurality of electrically conductive wires, wherein the first Zener diode the first optical isolator, the first voltage-regulated current source and the second Zener diode are in series; and wherein the first Zener diode, the first optical isolator, the first voltage-regulated current source, and the second Zener diode are in parallel with the first capacitor.

8. The redundant power system of claim 1 wherein the second one of the plurality of circuits comprises:

a second capacitor coupled to a first and second ones of the second plurality of electrically conductive wires;

a third Zener diode coupled to the first one of the second plurality of electrically conductive wires and the second capacitor;

a second optical isolator coupled to the third Zener diode, a second voltage-regulated current source coupled to the second optical isolator;

a second resistor coupled to the second optical isolator and the second voltage-regulated current source; and a fourth Zener diode coupled to the second voltage-regulated current source, the second capacitor and the second one of the second plurality of electrically conductive wires, wherein the third Zener diode, the second optical isolator, the second voltage-regulated current source and the fourth Zener diode are in series, and wherein the third Zener diode, the second optical isolator, the second voltage-regulated current source, and the fourth Zener diode are in parallel with the second capacitor.

9. The redundant power system of claim 1, wherein the redundant power system remains in operation if the first connector is uncoupled from the power distribution module, and wherein the DC power system remains in operation if the second cable connector is uncoupled from the power distribution module.

10. A method of operating a redundant power system comprising:

redundantly supplying power from a first power cable and a second power cable to a power distribution module, wherein the first power cable has a first end located within a first connector, and wherein the second power cable has a second end located within a second connector;

monitoring the power supplied by the first power cable to the power distribution module utilizing a first plurality of circuits located within the first connector;

monitoring the power supplied by the second power cable to the power distribution module utilizing a second plurality of circuits located within the second connector;

using the first power cable and the first plurality of circuits to generate a first connection signal when the first power cable supplies power to the power distribution module;

using the second power cable and the second plurality of circuits to generate a second connection signal when the second power cable supplies power to the distribution module; and transmitting the first and second connection signal.

11. The method of claim 10, further comprising:

using the first power cable to monitor power supplied by the first power cable, and using the second power cable to monitor power supplied by the second power cable.

12. The method of claim 10, further comprising:

transmitting an alarm if the first power cable fails to generate the first connection signal, and transmitting the alarm if the second power cable fails to generate the second connection signal.

13. The method of claim 10, further comprising:

transmitting an alarm if the first power cable is uncoupled from the power distribution module; and transmitting the alarm if the second power cable is disconnected from the power distribution module.

* * * * *